(12) United States Patent
Cox

(10) Patent No.: US 12,204,966 B2
(45) Date of Patent: *Jan. 21, 2025

(54) METAL CARD

(71) Applicant: X-Card Holdings, LLC, West Chester, PA (US)

(72) Inventor: Mark A. Cox, West Chester, PA (US)

(73) Assignee: X-CARD HOLDINGS, LLC, West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,144

(22) Filed: Nov. 16, 2023

(65) Prior Publication Data

US 2024/0086665 A1 Mar. 14, 2024

Related U.S. Application Data

(63) Continuation of application No. 17/838,585, filed on Jun. 13, 2022, now Pat. No. 11,853,824, which is a continuation of application No. 16/337,123, filed as application No. PCT/US2019/020919 on Mar. 6, 2019, now Pat. No. 11,361,204.

(60) Provisional application No. 62/639,535, filed on Mar. 7, 2018.

(51) Int. Cl.
*G06K 19/02* (2006.01)
*G06K 19/077* (2006.01)

(52) U.S. Cl.
CPC ....... *G06K 19/02* (2013.01); *G06K 19/07728* (2013.01); *G06K 19/07745* (2013.01); *G06K 19/07771* (2013.01)

(58) Field of Classification Search
CPC ........ G06K 19/00; G06K 19/04; G06K 19/06; G06K 19/0646; G06K 19/07728; G06K 19/07745; G06K 19/07771; G06K 19/0723; G06K 19/0718; G06K 19/07; G06F 21/31
USPC ................................ 235/487, 492, 380, 375
See application file for complete search history.

(56) References Cited

U.S. PATENT DOCUMENTS

| | | | |
|---|---|---|---|
| 2,890,202 | A | 6/1959 | Parker |
| 3,024,216 | A | 3/1962 | Smitmans et al. |
| 3,847,654 | A | 11/1974 | Althouse |
| 4,115,479 | A | 9/1978 | Diadone |
| 4,117,036 | A | 9/1978 | Honda et al. |

(Continued)

FOREIGN PATENT DOCUMENTS

| | | |
|---|---|---|
| CN | 1279797 | 1/2001 |
| CN | 1305618 | 7/2001 |

(Continued)

OTHER PUBLICATIONS

"Material Safety Data Sheet for Rigid PVC (Vinyl) Films," Klöckner Pentaplast of America, Inc., Rev. Mar. 2010.

(Continued)

*Primary Examiner* — Edwyn Labaze
(74) *Attorney, Agent, or Firm* — Duane Morris LLP

(57) ABSTRACT

A card core includes a body defining a cutout and a discontinuity. The cutout includes an opening in the body defined by an edge and the discontinuity includes a channel defined by the body extending from an outer surface of the body to the cutout. The cutout is sized and configured to define a gap between an element positioned in the cutout and the edge to electromagnetically isolate the element from the body.

19 Claims, 10 Drawing Sheets

(56) References Cited

U.S. PATENT DOCUMENTS

| | | |
|---|---|---|
| 4,310,451 A | 1/1982 | Ernest et al. |
| 4,322,170 A | 3/1982 | Papenmeier |
| 4,382,201 A | 5/1983 | Trzaskos |
| 4,399,061 A | 8/1983 | Sickert |
| 4,417,413 A | 11/1983 | Hoppe et al. |
| 4,463,128 A | 7/1984 | Lin |
| 4,463,971 A | 8/1984 | Hoppe et al. |
| 4,480,079 A | 10/1984 | Orton et al. |
| 4,627,642 A | 12/1986 | Peronneau et al. |
| 4,640,636 A | 2/1987 | Hofmann |
| 4,742,085 A | 5/1988 | Cozens |
| 4,743,636 A | 5/1988 | Bersano |
| 4,754,319 A | 6/1988 | Saito et al. |
| 4,769,278 A | 9/1988 | Kamimura et al. |
| 4,775,698 A | 10/1988 | Cozens |
| 4,775,699 A | 10/1988 | Cozens |
| 4,775,700 A | 10/1988 | Cozens |
| 4,775,701 A | 10/1988 | Cozens |
| 4,775,702 A | 10/1988 | Cozens |
| 4,801,418 A | 1/1989 | Bersano |
| 4,843,225 A | 6/1989 | Hoppe |
| 4,889,749 A | 12/1989 | Ohashi et al. |
| 4,929,171 A | 5/1990 | Hayashi |
| 4,954,195 A | 9/1990 | Turpin |
| 5,013,900 A | 5/1991 | Hoppe |
| 5,084,501 A | 1/1992 | Drout et al. |
| 5,084,699 A | 1/1992 | Demichele |
| 5,126,396 A | 6/1992 | Orton et al. |
| 5,143,723 A | 9/1992 | Calvo et al. |
| 5,198,170 A | 3/1993 | Hawrylko |
| 5,198,501 A | 3/1993 | Bott et al. |
| 5,233,022 A | 8/1993 | Donatti et al. |
| 5,255,430 A | 10/1993 | Tallaksen |
| D341,092 S | 11/1993 | Wild |
| 5,276,106 A | 1/1994 | Portelli et al. |
| 5,281,855 A | 1/1994 | Hadden et al. |
| 5,286,437 A | 2/1994 | Severiens |
| 5,298,542 A | 3/1994 | Nakamura |
| 5,319,028 A | 6/1994 | Nakamura |
| 5,324,506 A | 6/1994 | Calvo et al. |
| 5,407,617 A | 4/1995 | Oppermann et al. |
| 5,407,893 A | 4/1995 | Koshizuka et al. |
| 5,462,996 A | 10/1995 | Portelli et al. |
| D378,064 S | 2/1997 | Wild |
| 5,599,765 A | 2/1997 | Ohshima et al. |
| 5,626,958 A | 5/1997 | D'Herbecourt et al. |
| 5,672,646 A | 9/1997 | Allas et al. |
| 5,690,773 A | 11/1997 | Fidalgo et al. |
| 5,767,503 A | 6/1998 | Gloton |
| 5,822,194 A | 10/1998 | Horiba et al. |
| D404,319 S | 1/1999 | Deleskiewicz |
| 5,955,021 A | 9/1999 | Tiffany, III |
| 5,955,198 A | 9/1999 | Hashimoto et al. |
| 5,972,514 A | 10/1999 | D'Herbecourt et al. |
| 5,975,420 A | 11/1999 | Gogami et al. |
| 6,018,299 A | 1/2000 | Eberhardt |
| 6,037,879 A | 3/2000 | Tuttle |
| D423,374 S | 4/2000 | Deleskiewicz |
| 6,052,062 A | 4/2000 | Tuttle |
| 6,100,804 A | 8/2000 | Brady et al. |
| 6,107,920 A | 8/2000 | Eberhardt |
| 6,147,605 A | 11/2000 | Vega et al. |
| 6,191,382 B1 | 2/2001 | Damikolas |
| 6,217,685 B1 | 4/2001 | Leydier et al. |
| 6,233,818 B1 | 5/2001 | Finn et al. |
| 6,265,977 B1 | 7/2001 | Vega et al. |
| 6,330,464 B1 | 12/2001 | Colvin, Jr. et al. |
| 6,376,769 B1 | 4/2002 | Chung |
| 6,378,774 B1 | 4/2002 | Emori et al. |
| 6,380,272 B1 | 4/2002 | Chen |
| 6,380,845 B2 | 4/2002 | Tuttle |
| 6,406,757 B1 | 6/2002 | Blatter et al. |
| 6,423,760 B1 | 7/2002 | Qiao et al. |
| 6,441,085 B1 | 8/2002 | Saethre et al. |
| 6,446,874 B1 | 9/2002 | Elbaz et al. |
| 6,462,273 B1 | 10/2002 | Corisis et al. |
| 6,468,835 B1 | 10/2002 | Blanc et al. |
| 6,477,926 B1 | 11/2002 | Swisher et al. |
| 6,495,127 B1 | 12/2002 | Wallace et al. |
| 6,634,564 B2 | 1/2003 | Kuramochi |
| 6,521,985 B1 | 2/2003 | Dossetto |
| 6,534,588 B1 | 3/2003 | Löcken et al. |
| 6,551,537 B2 | 4/2003 | Chen |
| 6,581,839 B1 | 6/2003 | Lasch et al. |
| 6,599,993 B1 | 7/2003 | Norris |
| 6,611,050 B1 | 8/2003 | Ference et al. |
| 6,611,199 B1 | 8/2003 | Geiszler et al. |
| 6,624,212 B2 | 9/2003 | Weier et al. |
| 6,639,309 B2 | 10/2003 | Wallace |
| 6,649,688 B1 | 11/2003 | Mayer et al. |
| 6,653,394 B1 | 11/2003 | Meisenburg et al. |
| 6,673,423 B2 | 1/2004 | Kranenburg-Van Dijk et al. |
| 6,689,727 B1 | 1/2004 | Olsson |
| 6,693,513 B2 | 2/2004 | Tuttle |
| 6,698,089 B2 | 3/2004 | Finn et al. |
| 6,730,734 B1 | 5/2004 | Hamilton et al. |
| 6,749,123 B2 | 6/2004 | Lasch et al. |
| 6,764,014 B2 | 7/2004 | Lasch et al. |
| 6,765,289 B2 | 7/2004 | Nakata et al. |
| 6,768,415 B1 | 7/2004 | Tuttle |
| 6,780,897 B1 | 8/2004 | Blum et al. |
| 6,784,230 B1 | 8/2004 | Patterson et al. |
| 6,786,415 B2 | 9/2004 | Mu |
| 6,786,748 B2 | 9/2004 | Masson et al. |
| 6,790,893 B2 | 9/2004 | Nguyen et al. |
| 6,861,475 B2 | 3/2005 | Ilenda et al. |
| 6,884,837 B2 | 4/2005 | Kohlhammer et al. |
| 6,908,786 B2 | 6/2005 | Halope |
| 6,918,984 B2 | 7/2005 | Murray et al. |
| 6,943,437 B2 | 9/2005 | Blanc et al. |
| 6,960,620 B2 | 11/2005 | Wenning et al. |
| 6,984,205 B2 | 1/2006 | Gazdzinski |
| 6,986,465 B2 | 1/2006 | Kiekhaefer |
| 6,989,349 B2 | 1/2006 | Tatewaki et al. |
| 7,012,504 B2 | 3/2006 | Tuttle |
| 7,030,179 B2 | 4/2006 | Patterson et al. |
| 7,093,767 B2 | 8/2006 | Faenza et al. |
| 7,137,148 B2 | 11/2006 | Tao et al. |
| 7,147,625 B2 | 12/2006 | Sarangapani et al. |
| 7,217,747 B2 | 5/2007 | Weier et al. |
| 7,221,257 B1 | 5/2007 | Tuttle |
| 7,237,724 B2 | 7/2007 | Singleton |
| 7,306,158 B2 | 12/2007 | Berardi et al. |
| 7,377,443 B2 | 5/2008 | Lasch et al. |
| 7,377,446 B2 | 5/2008 | Ohta et al. |
| 7,382,045 B2 | 6/2008 | Osako et al. |
| 7,433,655 B2 | 10/2008 | Jacobs et al. |
| 7,440,771 B2 | 10/2008 | Purk et al. |
| 7,494,057 B2 | 2/2009 | Lasch et al. |
| 7,511,371 B2 | 3/2009 | Wallace |
| 7,528,191 B2 | 5/2009 | Metzemacher et al. |
| 7,530,491 B2 | 5/2009 | Lasch et al. |
| 7,544,266 B2 | 6/2009 | Herring et al. |
| 7,545,336 B2 | 6/2009 | Naito |
| 7,566,001 B2 | 7/2009 | Yamazaki |
| 7,588,184 B2 | 9/2009 | Gandel et al. |
| 7,592,394 B2 | 9/2009 | Yang et al. |
| 7,597,266 B2 | 10/2009 | Benato |
| 7,601,563 B2 | 10/2009 | Chen et al. |
| 7,607,583 B2 | 10/2009 | Berardi et al. |
| 7,608,306 B2 | 10/2009 | Hasskerl et al. |
| 7,668,588 B2 | 2/2010 | Kovacs |
| 7,721,956 B2 | 5/2010 | Williams et al. |
| 7,757,957 B2 | 7/2010 | Cranston et al. |
| 7,795,077 B2 | 9/2010 | Tsai et al. |
| 7,819,310 B2 | 10/2010 | Lasch et al. |
| 7,823,777 B2 | 11/2010 | Varga et al. |
| 7,837,116 B2 | 11/2010 | Morrill et al. |
| 7,868,441 B2 | 1/2011 | Eaton et al. |
| 7,877,120 B2 | 1/2011 | Jacobs et al. |
| 7,917,298 B1 | 3/2011 | Scher et al. |
| 7,939,920 B2 | 5/2011 | Wallace |
| 7,954,724 B2 | 6/2011 | Poidomani et al. |
| 7,989,268 B2 | 8/2011 | Chen et al. |

(56) References Cited

U.S. PATENT DOCUMENTS

| | | |
|---|---|---|
| 8,012,809 B2 | 9/2011 | Reed |
| 8,017,147 B2 | 9/2011 | Mazed et al. |
| 8,033,457 B2 | 10/2011 | Varga et al. |
| 8,034,153 B2 | 10/2011 | Marchiando et al. |
| 8,044,508 B2 | 10/2011 | Jenson et al. |
| 8,066,190 B2 | 11/2011 | Faenza, Jr. |
| 8,079,514 B2 | 12/2011 | Lasch et al. |
| 8,100,337 B2 | 1/2012 | Artigue et al. |
| 8,186,582 B2 | 5/2012 | Varga et al. |
| 8,186,598 B2 | 5/2012 | Faenza, Jr. et al. |
| 8,191,788 B2 | 6/2012 | Morrill-Webb et al. |
| 8,231,063 B2 | 7/2012 | Poidomani et al. |
| 8,261,997 B2 | 9/2012 | Gebhart |
| 8,360,312 B2 | 1/2013 | Varga et al. |
| 8,366,009 B2 | 2/2013 | VFinn et al. |
| 8,382,000 B2 | 2/2013 | Mullen et al. |
| 8,393,547 B2 | 3/2013 | Kiekhaefer et al. |
| 8,424,773 B2 | 4/2013 | Mullen et al. |
| 8,474,726 B2 | 7/2013 | Finn et al. |
| 8,523,062 B2 | 9/2013 | Varga et al. |
| 8,540,165 B2 | 9/2013 | Foo et al. |
| 8,551,387 B2 | 10/2013 | Feldman et al. |
| D693,264 S | 11/2013 | Rabassa |
| 8,608,080 B2 | 12/2013 | Finn |
| 8,608,082 B2 | 12/2013 | Le Garrec et al. |
| 8,672,232 B2 | 3/2014 | Herslow |
| 8,673,452 B2 | 3/2014 | Petzoldt et al. |
| 8,678,276 B2 | 3/2014 | Poidomani et al. |
| 8,789,762 B2 | 7/2014 | Finn et al. |
| 8,991,712 B2 | 3/2015 | Finn et al. |
| D729,074 S | 5/2015 | Boulangeot |
| 9,033,250 B2 | 5/2015 | Finn et al. |
| 9,104,954 B2 | 8/2015 | Lahoui et al. |
| 9,112,272 B2 | 8/2015 | Finn et al. |
| 9,122,968 B2 | 9/2015 | Cox |
| 9,183,486 B2 | 11/2015 | Cox |
| 9,439,334 B2 | 9/2016 | Cox |
| 9,688,850 B2 | 6/2017 | Cox |
| 9,798,968 B2 | 10/2017 | Finn et al. |
| 10,762,412 B2 | 9/2020 | Lowe et al. |
| 2001/0034399 A1 | 10/2001 | Kohlhammer et al. |
| 2001/0043141 A1 | 11/2001 | Tuttle |
| 2002/0013387 A1 | 1/2002 | Weier et al. |
| 2002/0042452 A1 | 4/2002 | Chen |
| 2002/0055581 A1 | 5/2002 | Lorah et al. |
| 2002/0086908 A1 | 7/2002 | Chou et al. |
| 2002/0091178 A1 | 7/2002 | Amin-Javaheri |
| 2002/0119294 A1 | 8/2002 | Monkarsh et al. |
| 2002/0125431 A1 | 9/2002 | Hwang |
| 2002/0125598 A1 | 9/2002 | Chen |
| 2002/0131251 A1 | 9/2002 | Corisis et al. |
| 2002/0132086 A1 | 9/2002 | Su-Tuan |
| 2002/0140546 A1 | 10/2002 | Tuttle |
| 2002/0146549 A1 | 10/2002 | Kranenburg-Van Dijk et al. |
| 2003/0020182 A1 | 1/2003 | Blanc et al. |
| 2003/0057288 A1 | 3/2003 | Salzgeber |
| 2003/0105188 A1 | 6/2003 | Nguyen et al. |
| 2003/0153120 A1 | 8/2003 | Halope |
| 2003/0175433 A1 | 9/2003 | Wenning et al. |
| 2003/0183914 A1 | 10/2003 | Wallace |
| 2003/0216701 A1 | 11/2003 | Sumarta |
| 2003/0217517 A1 | 11/2003 | Allison et al. |
| 2004/0002559 A1 | 1/2004 | Troutman et al. |
| 2004/0023538 A1 | 2/2004 | Masson et al. |
| 2004/0036155 A1 | 2/2004 | Wallace |
| 2004/0077756 A1 | 4/2004 | Weier et al. |
| 2004/0077784 A1 | 4/2004 | Ilenda et al. |
| 2004/0083531 A1 | 5/2004 | Tao et al. |
| 2004/0145453 A1 | 7/2004 | Tuttle |
| 2004/0180476 A1 | 9/2004 | Kazlas et al. |
| 2004/0192794 A1 | 9/2004 | Patterson et al. |
| 2004/0216658 A1 | 11/2004 | Lin |
| 2004/0266940 A1 | 12/2004 | Issari |
| 2005/0004525 A1 | 1/2005 | Sarangapani et al. |
| 2005/0008604 A1 | 1/2005 | Schultz et al. |
| 2005/0023665 A1 | 2/2005 | Ledwidge |
| 2005/0025725 A1 | 2/2005 | Schultz et al. |
| 2005/0031870 A1 | 2/2005 | Liu et al. |
| 2005/0051536 A1 | 3/2005 | Shirlin et al. |
| 2005/0130840 A1 | 6/2005 | Tatewaki et al. |
| 2005/0182156 A1 | 8/2005 | Liu |
| 2005/0203242 A1 | 9/2005 | Nakayama et al. |
| 2005/0218551 A1 | 10/2005 | Halahmi et al. |
| 2005/0234154 A1 | 10/2005 | Halahmi |
| 2006/0042827 A1 | 3/2006 | Chou et al. |
| 2006/0079612 A1 | 4/2006 | Troutman et al. |
| 2006/0100378 A1 | 5/2006 | Wu |
| 2006/0134705 A1 | 6/2006 | Sundrehagen |
| 2006/0135705 A1 | 6/2006 | Vallance et al. |
| 2006/0155035 A1 | 7/2006 | Metzemacher et al. |
| 2006/0168802 A1 | 8/2006 | Tuttle |
| 2006/0181478 A1 | 8/2006 | Benato |
| 2006/0192674 A1 | 8/2006 | Roberta |
| 2006/0260751 A1 | 11/2006 | Lauder et al. |
| 2007/0034700 A1 | 2/2007 | Poidomani et al. |
| 2007/0087230 A1 | 4/2007 | Jenson et al. |
| 2007/0096265 A1 | 5/2007 | Wallace |
| 2007/0103983 A1 | 5/2007 | Watanabe et al. |
| 2007/0104938 A1 | 5/2007 | Lin |
| 2007/0117276 A1 | 5/2007 | Chen et al. |
| 2007/0131144 A1 | 6/2007 | Winter et al. |
| 2007/0193643 A1 | 8/2007 | Jarvenkyla |
| 2007/0208233 A1 | 9/2007 | Kovacs |
| 2007/0208262 A1 | 9/2007 | Kovacs |
| 2007/0252705 A1 | 11/2007 | Halope et al. |
| 2008/0001715 A1 | 1/2008 | Tuttle |
| 2008/0073770 A1 | 3/2008 | Yee et al. |
| 2008/0096326 A1 | 4/2008 | Reed |
| 2008/0136160 A1 | 6/2008 | Leenders |
| 2008/0174438 A1 | 7/2008 | Tuttle |
| 2008/0194736 A1 | 8/2008 | Lu |
| 2008/0207837 A1 | 8/2008 | Weiss et al. |
| 2008/0249209 A1 | 10/2008 | Trummer et al. |
| 2008/0251906 A1 | 10/2008 | Eaton et al. |
| 2008/0262154 A1 | 10/2008 | Behrens et al. |
| 2008/0273299 A1 | 11/2008 | Tsai et al. |
| 2008/0282540 A1 | 11/2008 | Singleton |
| 2008/0315382 A1 | 12/2008 | Wallace |
| 2009/0017195 A1 | 1/2009 | Vallance et al. |
| 2009/0018248 A1 | 1/2009 | Pirri et al. |
| 2009/0020615 A1 | 1/2009 | Patel |
| 2009/0056591 A1 | 3/2009 | Schmidt et al. |
| 2009/0068556 A1 | 3/2009 | Jacobs et al. |
| 2009/0104367 A1 | 4/2009 | Simon |
| 2009/0127344 A1 | 5/2009 | Dostmann et al. |
| 2009/0130355 A1 | 5/2009 | Chen et al. |
| 2009/0131546 A1 | 5/2009 | Vazquez |
| 2009/0142981 A1 | 6/2009 | Arendt et al. |
| 2009/0159657 A1 | 6/2009 | Chen et al. |
| 2009/0168398 A1 | 7/2009 | Collier |
| 2009/0169776 A1 | 7/2009 | Herslow |
| 2009/0247369 A1 | 10/2009 | Chang |
| 2009/0252772 A1 | 10/2009 | Henglein et al. |
| 2009/0277663 A1 | 11/2009 | Valenta et al. |
| 2009/0283313 A1 | 11/2009 | Chen et al. |
| 2010/0012680 A1 | 1/2010 | Cobbley et al. |
| 2010/0015408 A1 | 1/2010 | Fong et al. |
| 2010/0019038 A1 | 1/2010 | Puente Baliarda et al. |
| 2010/0075104 A1 | 3/2010 | Dehennau et al. |
| 2010/0078329 A1 | 4/2010 | Mirsky et al. |
| 2010/0096166 A1 | 4/2010 | Fjelstad |
| 2010/0105273 A1 | 4/2010 | Motomura et al. |
| 2010/0144931 A1 | 6/2010 | Balduf |
| 2010/0179273 A1 | 7/2010 | Spyrou et al. |
| 2010/0249325 A1 | 9/2010 | Bothe et al. |
| 2010/0298469 A1 | 11/2010 | Kaupp et al. |
| 2010/0304118 A1 | 12/2010 | Baidak et al. |
| 2010/0321913 A1 | 12/2010 | Tsai et al. |
| 2011/0011939 A1 | 1/2011 | Seah |
| 2011/0097609 A1 | 4/2011 | Jenson et al. |
| 2011/0140744 A1 | 6/2011 | Kazlas et al. |
| 2011/0140841 A1 | 6/2011 | Bona et al. |
| 2011/0186641 A1 | 8/2011 | Kato et al. |
| 2011/0189620 A1 | 8/2011 | Herslow |

(56) References Cited

U.S. PATENT DOCUMENTS

| | | |
|---|---|---|
| 2011/0300413 A1 | 12/2011 | Jacobs et al. |
| 2011/0317355 A1 | 12/2011 | Jow |
| 2012/0018522 A1 | 1/2012 | Le Garrec et al. |
| 2012/0206969 A1 | 8/2012 | Droz |
| 2013/0009347 A1 | 1/2013 | Feldman et al. |
| 2013/0126622 A1 | 5/2013 | Finn et al. |
| 2013/0146670 A1 | 6/2013 | Grieshofer et al. |
| 2013/0168454 A1 | 7/2013 | Oh et al. |
| 2013/0255078 A1 | 10/2013 | Cox |
| 2013/0255848 A1 | 10/2013 | Cox |
| 2013/0258622 A1 | 10/2013 | Cox |
| 2013/0260065 A1 | 10/2013 | Cox |
| 2013/0261262 A1 | 10/2013 | Cox |
| 2013/0271265 A1 | 10/2013 | Finn et al. |
| 2013/0320095 A1 | 12/2013 | Blum |
| 2013/0332353 A1 | 12/2013 | Aidasani et al. |
| 2014/0014732 A1 | 1/2014 | Finn et al. |
| 2014/0021261 A1 | 1/2014 | Mosteller |
| 2014/0070009 A1 | 3/2014 | Zambrano |
| 2014/0091149 A1 | 4/2014 | Finn et al. |
| 2014/0102136 A1 | 4/2014 | Warren |
| 2014/0104133 A1 | 4/2014 | Finn et al. |
| 2014/0138443 A1 | 5/2014 | Blum et al. |
| 2014/0144993 A1 | 5/2014 | Seo et al. |
| 2014/0152511 A1 | 6/2014 | Merlin et al. |
| 2014/0166762 A1 | 6/2014 | Herslow |
| 2014/0260424 A1 | 9/2014 | Warren et al. |
| 2014/0284386 A1 | 9/2014 | Finn et al. |
| 2014/0292477 A1 | 10/2014 | Ahmadloo |
| 2014/0292983 A1 | 10/2014 | Nagahara |
| 2014/0361086 A1 | 12/2014 | Finn et al. |
| 2015/0021402 A1 | 1/2015 | Finn et al. |
| 2015/0021403 A1 | 1/2015 | Finn et al. |
| 2015/0129665 A1 | 5/2015 | Finn et al. |
| 2015/0136858 A1 | 5/2015 | Finn et al. |
| 2015/0235122 A1 | 8/2015 | Finn et al. |
| 2015/0327365 A1 | 11/2015 | Cox |
| 2016/0031201 A1 | 2/2016 | Cox |
| 2016/0110639 A1 | 4/2016 | Finn et al. |
| 2016/0152815 A1 | 6/2016 | Cox |
| 2016/0203399 A1 | 7/2016 | Cox |
| 2016/0342881 A1 | 11/2016 | Cox |
| 2016/0365644 A1 | 12/2016 | Finn et al. |
| 2017/0017871 A1 | 1/2017 | Finn et al. |
| 2018/0232617 A1 | 8/2018 | Kim et al. |
| 2020/0364527 A1* | 11/2020 | Coleman .............. G06K 19/063 |
| 2021/0232887 A1 | 7/2021 | Ritter |
| 2022/0253661 A1 | 8/2022 | Daley et al. |

FOREIGN PATENT DOCUMENTS

| | | |
|---|---|---|
| CN | 1351733 | 5/2002 |
| DE | 19915765 A1 | 10/2000 |
| EP | 0185422 | 6/1986 |
| EP | 0350179 A1 | 1/1990 |
| EP | 0754567 | 1/1997 |
| EP | 2063489 | 5/2009 |
| EP | 2093704 | 8/2009 |
| EP | 2386428 | 11/2011 |
| EP | 1854222 | 6/2012 |
| EP | 2525304 | 11/2012 |
| JP | H0793817 A | 4/1995 |
| JP | 2002261421 | 9/2002 |
| JP | 2005004429 | 1/2005 |
| JP | 2009205337 | 9/2009 |
| JP | 2010250467 | 11/2010 |
| KR | 1019900001745 B1 | 3/1990 |
| KR | 1020110058183 A | 6/2011 |
| KR | 1020110062486 A | 6/2011 |
| WO | 1988002762 A1 | 4/1988 |
| WO | 1999047331 A1 | 9/1999 |
| WO | 2000030031 A1 | 5/2000 |
| WO | 2008081224 A1 | 7/2008 |
| WO | 2013110625 | 8/2013 |
| WO | 2014016332 | 1/2014 |
| WO | 2014039183 A1 | 3/2014 |
| WO | 2015026612 A2 | 2/2015 |

OTHER PUBLICATIONS

"Material Safety Data Sheet acc. to ISO/DIS 11014 for Trade Name: 9-20557-LV," Dymax Corporation, Mar. 10, 2011.

"Material Safety Data Sheet acc. to ISO/DIS 11014 for Trade Name: 9-20557," Dymax Corporation, Sep. 21, 2011.

"Multi-Cure® 6-625-SV01-REV-A Adhesives for Metal, Glass and Plastics Product Data Sheet," Dymax Corporation, Sep. 24, 2010.

"Material Safety Data Sheet acc. to ISO/DIS 11014 for Trade Name: 6-625-REV-A," Dymax Corporation, Dec. 9, 2010.

"Product Specification Sheet for Vinyl Chloride/Vinyl Acetate Copolymer," The Dow Chemical Company, 1995, http://www.dow.com/svr/prod/vcvac.htm.

Database WPI Week 201150 Thomson Scientific. London. GB; AN 2011-J56990 XP002750795. & JP 2011 144213 A (Toray Ind Inc) Jul. 28, 2011 (Jul. 28, 2011) * abstract *.

Database WPI Week 201023 Thomson Scientific. London. GB; AN 2010-C93048 XP002750796. & JP 2010 059225 A (Toray Ind Inc) Mar. 18, 2010 (Mar. 18, 2010) * abstract *.

Chen, et al., A Metallic RFID tag Design for Steel-Bar and Wire-Rod Management Application in the Steel Industry, Prog. Electromag. Research, vol. 91, pp. 195-212, 2009.

Ciudad, et al, RFID in Metal Environments: An Overview on Low (LF) and Ultra-Low (ULF) Frequency Systems, in Radio Frequency Identification Fundamentals and Applications Design Methods and Solutios, Cristina Turcu (Ed.), ch. 11, pp. 181-196, InTech, Rijeka Croatia, 2010.

Qing, et al., Proximity Effects of Metallic Environments on High Frequency RFID Reader Antenna: Study and Applications, IEEE Trans. Antennas Propag., vol. 55, No. 11, pp. 3105-3111, Nov. 2007 (Abstract Only).

Mukherjee, S., Mitigation of Proximity to Metal for Magnetically Coupled Transponders by Use of Resonant Loop, 2014 IEEE Int. Conf. on RFID, Orlando, FL, 2014, pp. 8-14 (Abstract Only).

\* cited by examiner

METAL CARD

CROSS-REFERENCE TO RELATED APPLICATIONS

This application is a continuation of U.S. patent application Ser. No. 17/838,585, filed Jun. 13, 2022, and entitled "METAL CARD", which is a continuation of U.S. patent application Ser. No. 16/337,123, filed Mar. 27, 2019, and entitled "METAL CARD" (now U.S. Pat. No. 11,361,204), which is a national phase entry under 35 U.S.C. § 371 of international patent application no. PCT/US2019/020919, filed Mar. 6, 2019, and entitled "METAL CARD," which claims benefit of U.S. Provisional Application No. 62/639,535, filed Mar. 7, 2018, and entitled "DUAL INTERFACE METAL CARD," the disclosures of each of which is incorporated herein by reference in its respective entirety.

BACKGROUND

Information carrying cards provide identification, authentication, data storage and application processing. Such cards or parts include key cards, identification cards, telephone cards, credit cards, bankcards, tags, bar code strips, other smart cards and the like.

Current information carrying cards use plastic or other polymer material cores. Current materials fail to provide a desired tactile response and strength. For example, information carrying cards need to withstand flexing to protect identifying components from damage as well as offer good durability during use. In addition, information carrying cards should be appealing, in terms of appearance and feel, to the end user, in order to facilitate use and adoption of the information carrying card. The use of conductive materials for information carrying cards has been disfavored due to coupling (i.e., inductive, conductive, etc.) between circuit elements and the conductive material when used to form an information carrying card.

SUMMARY

In various embodiments, a card core is disclosed. The card core includes a body defining a cutout and a sinuous line discontinuity. The cutout includes an opening in the body defined by an edge and the sinuous line discontinuity includes a channel defined by the body including at least one curved portion and at least one straight portion. The sinuous line discontinuity extends from an outer surface of the body to the cutout.

In various embodiments, a credential card is disclosed. The credential card includes a card core, a first material layer, and a second material layer. The card core includes a body defining a cutout and a sinuous line discontinuity. The cutout includes an opening in the body defined by an edge and the sinuous line discontinuity comprises a channel defined by the body including at least one curved portion and at least one straight portion. The sinuous line discontinuity extends from an outer surface of the body to the cutout. The first material layer is disposed over a first side of the card core and the second material layer is disposed over a second side of the card core. The first material layer is coupled to the second material layer in a position substantially aligned with the cutout defined by the body of the card core.

In various embodiments, a card core is disclosed. The card core includes a body defining a cutout and a discontinuity. The cutout includes an opening in the body defined by an edge and the discontinuity includes a channel defined by the body extending from an outer surface of the body to the cutout. The cutout includes a first portion having a first geometry and a second portion having a second geometry and is sized and configured to define a gap between an element positioned in the cutout and the edge to electromagnetically isolate the element from the body.

BRIEF DESCRIPTION OF FIGURES

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The present disclosure generally relates to a dual interface metal card having a current notch formed therein to reduce eddy currents generated in a metal card core. The dual interface metal card has a circuit core positioned between a first metal portion and a second metal portion. The first and second metal portions each define a cutout, such as an antenna cutout. The first and second metal portions further define a discontinuity extending from the cutout to a first edge of the metal card core.

Figure 1:
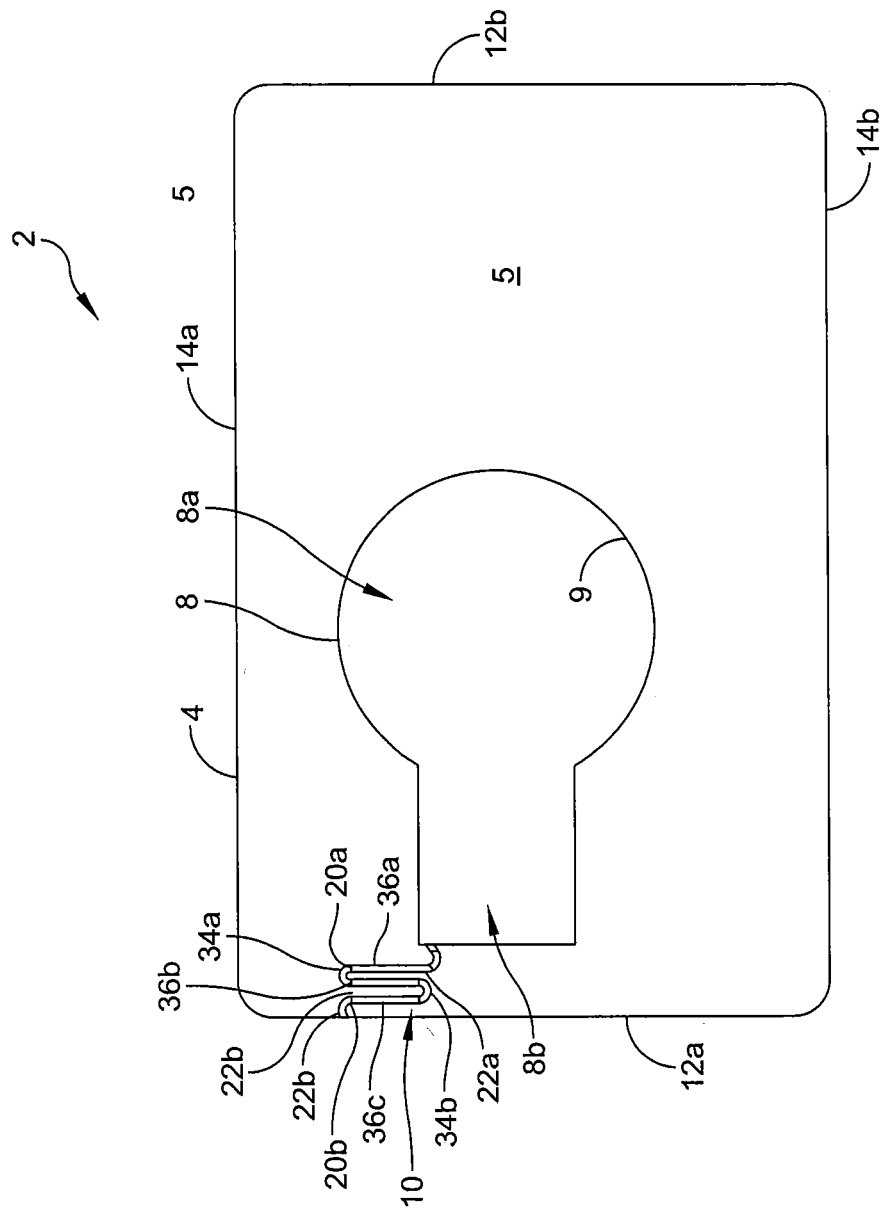
FIG. 1 illustrates a front view of a card core of a dual interface card defining a cutout and a sinuous line discontinuity, in accordance with some embodiments.

FIG. 1 illustrates a card core 2 of a dual interface card, in accordance with some embodiments. The card core 2 includes a body 4. In the illustrated embodiment, the body 4 includes a generally rectangular shape defined by a plurality of short edges 12a, 12b and a plurality of long edges 14a, 14b, although it will be appreciated that the metal core 2 can include any suitable shape, such as any suitable regular or irregular geometric shape (e.g., square, rectangle, circle, trapezoid, rhombus, triangle, etc.). The body 4 may include any suitable material, such as a metal material, a partially metal material, a conductive non-metal material, a non-conductive non-metal material, and/or any other suitable material. The body material may be selected to provide one or more predetermined features, such as a feel, strength, resiliency, harmonic, and/or other feature, to a card formed using the card core 2. Example materials include, but are not limited to, stainless steel, tungsten, spring steel, etc. In some embodiments, the body 4 may include a combination of conductive and/or non-conductive materials. Example non-conductive materials include, but are not limited to, wood, ceramics, non-conductive plastics, etc.

In some embodiments, the body 4 defines a void or cutout 8. The cutout 8 may include multiple portions each having separate geometries. For example, in the illustrated embodiment, the cutout 8 includes a first portion 8a defined by a circular opening in the body 4 and a second portion 8b defined by a square opening in the body 4, although it will be appreciated that each of the cutout portions 8a, 8b may have any suitable geometry. As shown in FIG. 1, in some embodiments, two or more cutout portions 8a, 8b may overlap such that the first cutout portion 8a is continuous with the second portion 8b. In some embodiments, the cutout 8 is positioned adjacent to a first short edge 12a of the card core 2.

In some embodiments, the body 4 may define a plurality of cutouts 8 each having one or more portions. The plurality of cutouts 8 may be spaced about the body 4 such that each of the cutouts is separated by a portion of the body 4. For example, in some embodiments, the body 4 may define a first cutout 8 as illustrated in FIG. 1 and a second cutout (not shown) located adjacent to a second short edge 12b of the body 4. Although the card core embodiments discussed herein include a single cutout 8 defining multiple portions, it will be appreciated that the various structures, systems, and methods disclosed herein apply equally to card cores having multiple cutouts and are within the scope of this disclosure and the appended claims.

Each portion 8a, 8b of the cutout 8 may be sized and configured to receive a circuit element therein. Each portion 8a, 8b of the cutout 8 defines an opening such that the a circuit element positioned within the cutout 8 can be effectively electromagnetically isolated from the surrounding material of the body 4. The effective spacing (or gap 26, see FIG. 2) between a circuit element and the edge 9 of the cutout 8 may vary based on the circuit element positioned within the cutout 8 (or a portion 8a, 8b thereof). For example, in some embodiments, each circuit element positioned within the cutout 8 may be spaced at least 300 microns, at least 500 microns, at least 700 microns, and/or any other suitable spacing from the edge 9 of the cutout 8 to effectively isolate a circuit element positioned within the cutout 8 from the material of the body 4. It will be appreciated that the spacing may be larger and/or smaller based on the circuit element positioned within the cutout 8 and/or properties of the card core 2 (for example, based on the material of the card core 2).

In some embodiments, the body 4 defines a sinuous line discontinuity 10 extending from an outer edge (such as first short edge 12a) of the body 4 to an inner edge 10 of the cutout 8. The sinuous line discontinuity 10 includes a break or channel in the body 4 such that a continuous circular path does not exist within the body 4 that extends around the cutout 8. The sinuous line discontinuity 10 can include any suitable gap within the body 4 sufficient to effectively prevent electromagnetic coupling between a first edge 20a and a second edge 20b of the body 4 defining the sinuous line discontinuity 10. For example, in some embodiments, the sinuous line discontinuity 10 includes a channel having a width of about 300-900 microns, at least 300 microns, at least 500 microns, at least 700 microns, up to 1000 microns, up to 2000 microns, etc., although it will be appreciated that discontinuities of greater and/or lesser size can be used and are within the scope of this disclosure.

In some embodiments, the sinuous line discontinuity 10 defines a plurality of flexible fingers 22a, 22b, for example, a first flexible finger 22a and a second flexible finger 22b. the flexible fingers 22a, 22b may be arranged in a parallel relationship and are configured to provide a flex profile similar to the continuous portion of the body 4 when a force is applied to a card including the card core 2. For example, and as discussed in greater detail below, the card core 2 may be incorporated into a credential card, such as a credit card, biometric card, etc. The credential card may include a plurality of additional layers and/or materials, such as, for example, thermoplastic layers, adhesive layers, polymer layers, etc. The length and width of each of the flexible fingers 22a, 22b may be selected such that the portion of the credential card containing the sinuous line discontinuity 10 provides a flex profile similar to the solid portions of a finished credential card. The flexible fingers 22a, 22b are configured to prevent cracking, breaking, and/or deformation of the card core and/or additional material layers formed on and/or around the sinuous line discontinuity 10.

The sinuous line discontinuity 10 and the flexible fingers 22a, 22b are configured to distribute pressure applied to a finished credential card incorporating the card core 2 to allow bending in the finished credential card. The sinuous line discontinuity 10 and the flexible fingers 22a, 22b are selected so as to provide a flex profile similar to the remainder of the finished credential card (i.e., the portion of the credential card incorporating the solid sections of the body 4) to prevent cracking of any layer of the finished credential card when bending pressure is applied. The sinuous line discontinuity 10 prevents card stress and breakage by distributing the surface area and torque pressure of an applied force evenly across the finished credential card (and the card core 2), avoiding cracking and/or breakage in a finished credential card or similar card containing the card core 2.

In some embodiments, the flexible fingers 22a, 22b are sized and configured such that each flexible finger 22a, 22b is configured to flex out-of-plane at a maximum predetermined angle with respect to the an adjacent portion of the body 4. For example, in some embodiments, the each flexible finger 22a, 22b is configured to provide a flex profile that allows an out-of-plane flex of up to 120° with respect to an adjacent planar portion of the body 4. The flex profile of each of the flexible fingers 22a, 22b is selected to prevent cracking, marking, and/or permanent bending of a finished credential card that incorporates the card core 2 therein. In some embodiments, the flex profile is selected such that each flexible finger 22a, 22b provides a similar response in the area of the sinuous line discontinuity 10 as would be provided by a solid portion of the body 4 positioned in the same location, although it will be appreciated that each flexible finger 22a, 22b can provide a greater or lesser flex if necessary to provide a proper flex response of a finished credential card.

In some embodiments, the sinuous line discontinuity is configured to reduce and/or eliminate eddy currents generated in the body 4 during operation. For example, in some embodiments, exposure of a card core 2 comprising a metallic, semi-metallic, or other conductive material to one or more electromagnetic signals typically generates one or more eddy currents in the conductive body 4. Eddy currents flow in a closed loop within the conductor (e.g., body 4). The sinuous line discontinuity eliminates any conductive loop around the cutout 8 and effectively reduces the area available for eddy currents. The sinuous line discontinuity effectively reduces and/or eliminates eddy currents (and other signals) generated in and/or by the body 4. Although a single sinuous line discontinuity is illustrated, it will be appreciated that a card core 2 can include a plurality of cutouts 8 each having one or more discontinuities 10 extending from an outer edge 12a, 12b, 14a, 14b of the body 4.

In some embodiments, the sinuous line discontinuity 10 includes a plurality of curved portions 34a-34d coupled by a plurality of substantially straight portions 36a-36c. The plurality of substantially straight portions 36a-36c each extend substantially parallel to each other over a predetermine length of the card core 2. In some embodiments, the sinuous line discontinuity 10 defines a smooth, repetitive oscillating curve (e.g., a sinusoidal curve), although it will be appreciated that the discontinuity 10 can include sharp (e.g., non-smooth) curved portions and/or non-parallel portions and such sinuous line discontinuity 10 is within the scope of this disclosure. In various embodiments, the card core 2 can include a plurality of cutouts 8 each having at least one sinuous line discontinuity 10 extending from an inner edge of the cutout 9 to an outer edge 12a, 12b 14a, 14b of the body 4.

Figure 5:
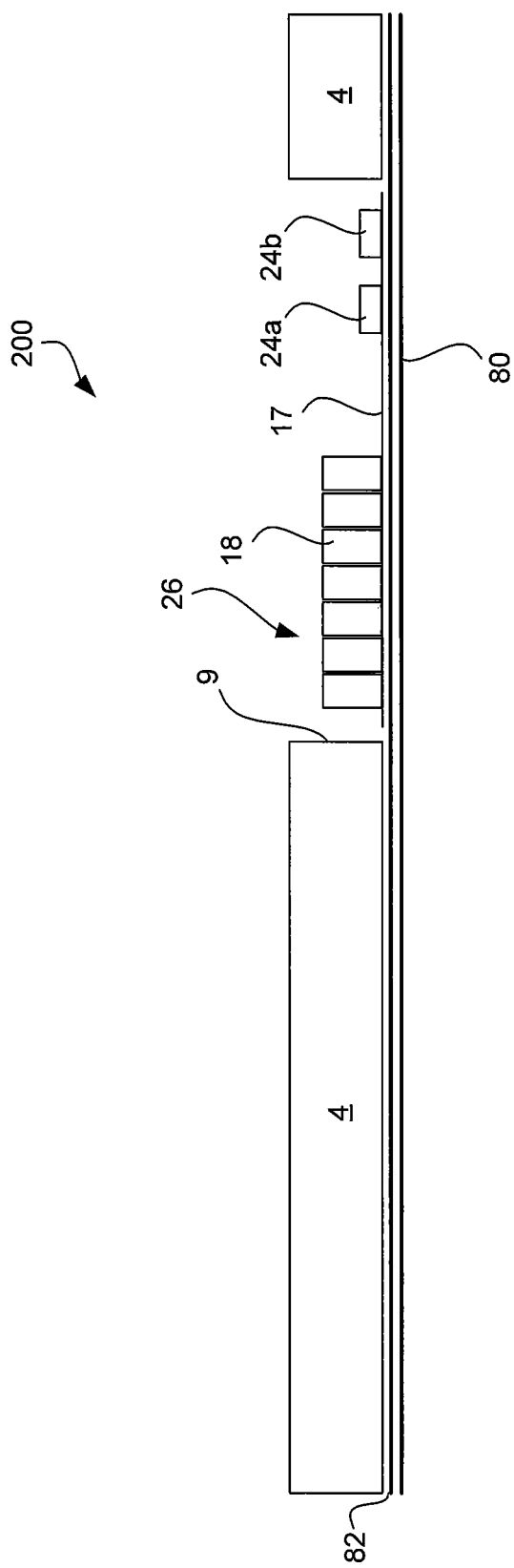
FIG. 5 illustrates a cross-sectional view of a credential core including the card core of FIG. 2 and a thermoplastic layer disposed on a first side of the card core, in accordance with some embodiments.
Figure 6:
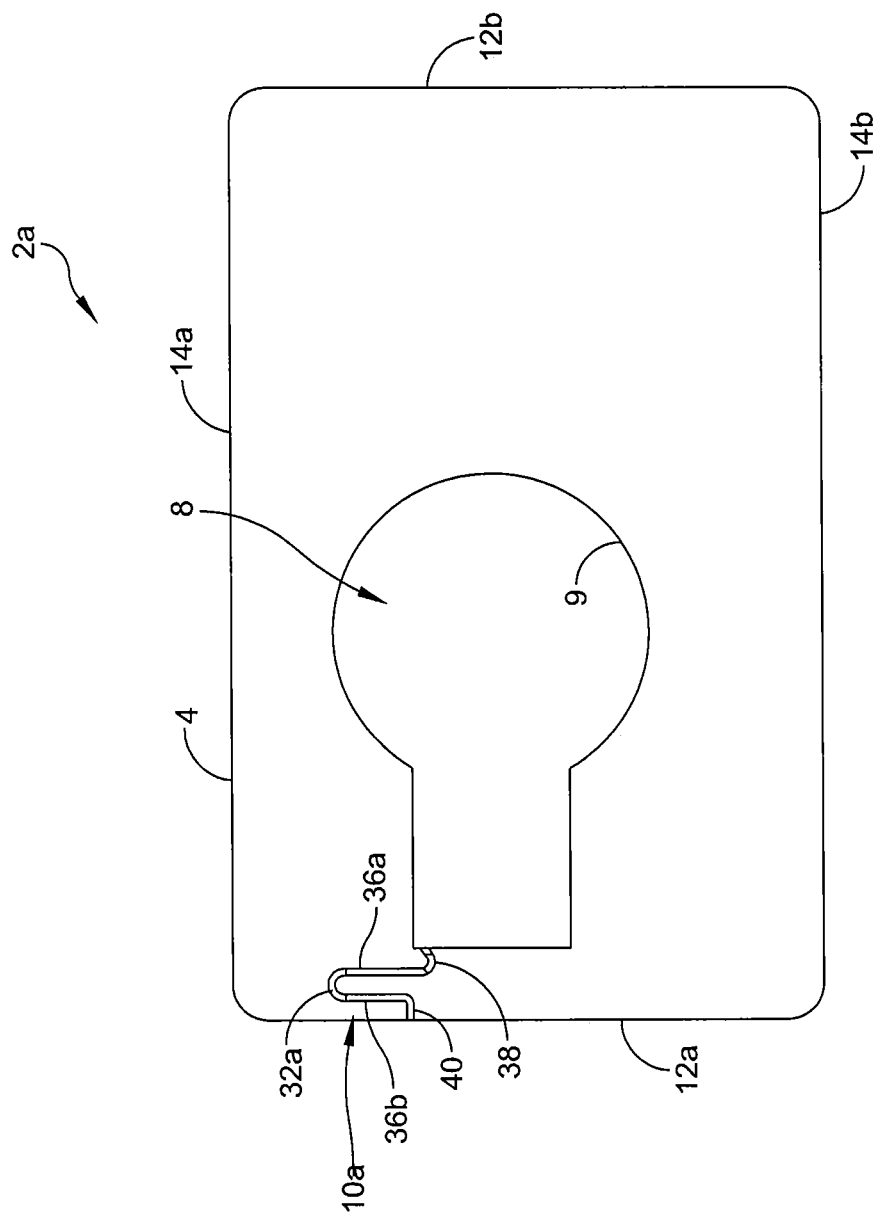
FIG. 6 illustrates a card core having a sinuous line discontinuity including a first straight line segment and a second straight line segment defining a single flexible finger, in accordance with some embodiments.

For example, in the illustrated embodiment, the sinuous line discontinuity 10 includes a first portion 38 extending from the cutout 8, a plurality of substantially straight portions 34a-34c extending at a non-parallel angle with respect to the first portion 38, a plurality of curved portions 32a-32d coupling the substantially straight portions 34a-34 cm each having a predetermined curvature over a predetermined area, and an second portion 40 extending at a predetermined angle with respect to the substantially straight portions 36a-36c to a first edge 12a of the card core 2. It will be appreciated that the curved portions 32a-32d can include any suitable curvature, such as, for example, any curvature between 45°-315°, 135°-225°, 160°-200°, 90°-270° and/or any other suitable curvature. It will be appreciated that the a card core 2 can include additional and/or different discontinuities, for example, as illustrated in FIGS. 5-6.

The cutout 8 and/or the sinuous line discontinuity 10 may be formed using any suitable method. For example, in various embodiments, the cutout 8 and/or the sinuous line discontinuity 10 may be formed using one or more of a milling technique, an etching technique, a molding technique, and/or any other suitable technique. It will be appreciated that the cutout 8 and the sinuous line discontinuity 10 may be formed using the same and/or different techniques. In some embodiments, the sinuous line discontinuity 10 is formed in the card core 2 prior to the card core 2 receiving any circuit elements within the cutouts 8.

Figure 2:
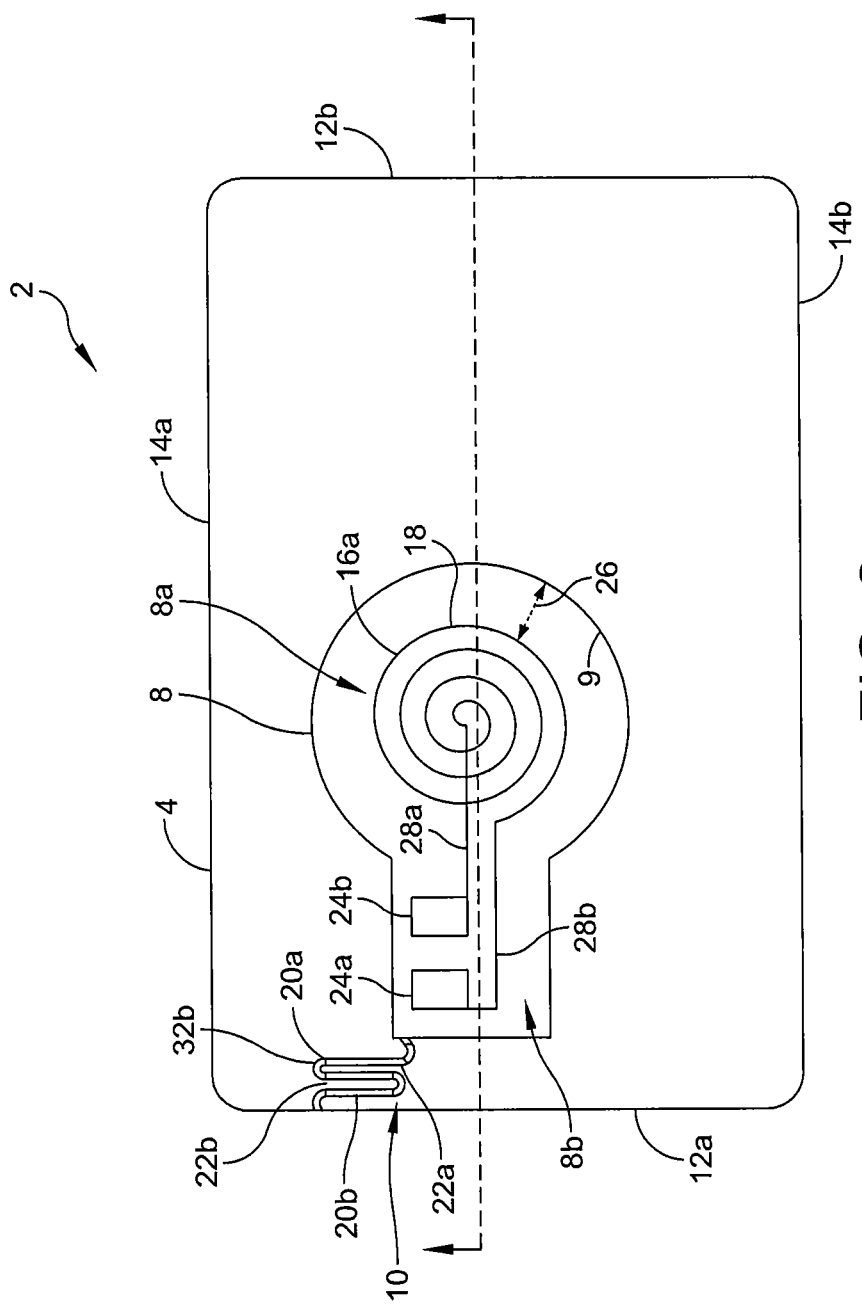
FIG. 2 illustrates the card core of FIG. 1 including a first circuit element positioned in a first portion of the cutout and contact pads formed in a second portion of the cutout, in accordance with some embodiments.
Figure 3:
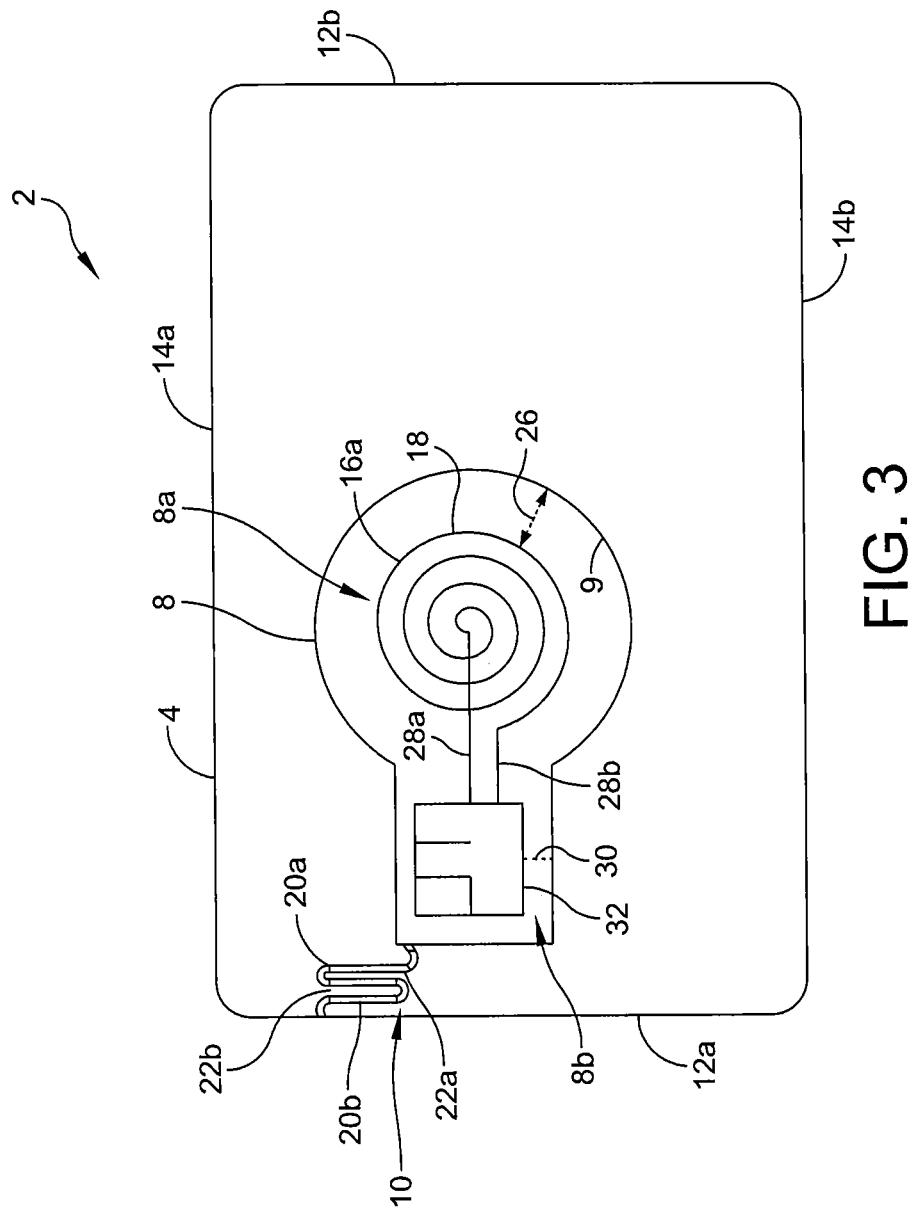
FIG. 3 illustrates a front view of the card core of FIG. 2 having a second circuit element coupled to the contact pads formed in the second portion of the cutout, in accordance with some embodiments.

FIGS. 2 and 3 illustrate the card core 2 of FIG. 1 having a plurality of circuit elements positioned within the cutout 8, in accordance with some embodiments. As shown in FIG. 2, in some embodiments, a first circuit element 16a, such as an antenna 18, may be positioned within a first portion 8a of a cutout 8. The antenna 18 includes a plurality of concentric wire coils. The antenna 18 can include any suitable antenna, such as a printed antenna including one or more circular coils. Although a generally circular antenna is illustrated, it will be appreciated by those skilled in the art that the antenna 18 can have any suitable shape and/or any suitable number of windings (or coils). In some embodiments, the first circuit element 16a can include a minimum thickness, such as, for example, a thickness between 50 and 100 microns, between 75 and 90 microns, and/or any other suitable thickness. The thickness of the first circuit element 16a may be less than, greater than, and/or equal to the thickness of the card core 2.

The first circuit element 16a is positioned within the first cutout portion 8a such that a gap 26 is maintained between the edge 9 of the cutout 8 and the outer edge of the first circuit element 16a. For example, in the illustrated embodiment, the antenna 8 is positioned to ensure a gap 26 suitable gap, such as at least 300 microns, at least 500 microns, at least 700 microns, 300-900 microns, up to 1000 microns, up to 2000 microns, and/or any other suitable gap is maintained between an outer coil of the antenna 18 and the edge 9. Although specific embodiments are discussed herein with respect to the illustrated circuit elements, it will be appreciated that the gap 26 can include any gap sufficient to electromagnetically isolate the first circuit element 16a from the material of the body 4.

In some embodiments, the gap 26 is selected based on one or more dimensions of the card core 2 and/or a credential card formed from the card core 2. For example, in some embodiments, the gap 26 is a distance equal to at least the width of a finished credential card formed using the card core 2. A finished credential card may have any thickness sufficient to contain the card core 2, one or more circuit elements positioned within the cutout 8, and/or any additional layers formed around the card core 2. For example, a finished credential card may have a thickness of at least 700 microns, at least 750 microns, at least 800 microns, etc.

In some embodiments, the first circuit element 16a is coupled to a plurality of contact pads 24a, 24b positioned within the second cutout portion 8b of the cutout by a plurality of leads 28a, 28b. The contact pads 24a, 24b are sized and configured to couple a second circuit element 16b (see FIG. 3), positioned within the second cutout portion 8b, to the first circuit element 16a. The contact pads 24a, 24b are positioned within the second cutout portion 8b to allow the second circuit element 16b to be coupled to the contact pads 24a, 24b while maintaining at least a second predetermined gap 30 (see FIG. 3) between the edge 9 of the cutout 8 and the second circuit element 16b. In some embodiments, the contact pads 24a, 24b are omitted and the second circuit element 16b may be directly coupled or not coupled to the first circuit element 16a.

In some embodiments, the first circuit element 16a, the contact pads 24a, 24b, and the leads 28a, 28b are formed integrally on a supporting film 17 (see FIG. 5). The supporting film 17 is sized and configured to be received within the cutout 8 while maintain the predetermined gaps 26, 30 between the circuit elements 16a, 16b and the edge 9 of the cutout 8. The first circuit element 16a, the contact pads 24a, 24b, and/or the leads 28a, 28b may be formed integrally on the supporting film 17 using any suitable formation method. For example, in some embodiments, the first circuit element 16a, the contact pads 24a, 24b and/or the leads 28a, 28b are printed circuit elements that are printed onto the supporting film 17 using a process to print conductive traces and/or other materials. Although embodiments are discussed herein including printed circuit elements, it will be appreciated that the first circuit element 16a, the contact pads 24a, 24b and/or the leads 28a, 28b may be formed using any suitable method.

FIG. 3 illustrates the card core 2 of FIG. 2 having a second circuit element 16b positioned within a second portion 8b of the cutout 8. The second circuit element 16b can include any suitable circuit element, such as, for example, an active circuit element(e.g., a direct contact System-on-Chip (SoC) element) 32. The second circuit element 16b may be positioned over and coupled to the contact pads 24a, 24b positioned within the second cutout 8b. The second circuit element 16b is electromagnetically isolated from the body 4 of the card core 2. For example, in the illustrated embodiment, the direct contact SoC element 32 is limited to direct contact coupling between the SoC element 32 and the antenna 18 and does not include any inductive coupling elements, effectively isolating the SoC element 32 from the material of the body 4. In some embodiments, the second circuit element 16b may be positioned a predetermined distance from the edge 9 of the cutout 8 such that a second circuit element 16b capable of inductive, conductive, or other contactless coupling is effectively isolated from the material of the body 4.

In some embodiments, the contact pads 24a, 24b and the first circuit element 16a are maintained in a co-planar relationship (i.e., are parallel with respect to a plane defined by the body 4). When the contact pads 24a, 24b and the first circuit element 16a are co-planar, a second circuit element 16b coupled to the contact pads 24a, 24b will be positioned out-of-plane (i.e., above or below) the first circuit element 16a. In such embodiments, the second circuit element 16b is coupled to the first circuit element 16a only through the leads 28a, 28b and does not include any additional coupling (i.e., inductive, conductive, etc.) between the second circuit element 16b and the first circuit element 16a.

In some embodiments, the second circuit element 16b includes a second antenna (not shown). The second antenna can have a different configuration as compared to the antenna 16 (e.g., greater and/or lesser antenna area, larger/smaller material, different shape, etc.) such that the second antenna produce different responses as compared to the antenna 16 when each is simultaneously exposed to the same electromagnetic signal.

In some embodiments, the card core 2 and the plurality of circuit elements 16a, 16b positioned within the cutout 8 can be coupled between one or more additional layers, materials, and/or surfaces to form a credential core and/or a finished credential card (e.g., a credit/debit card, and ATM or bank card, an identification card, a state issued license or identification (e.g., driver's license), a security badge, a loyalty card, biometric card, etc.). The additional layers can include any suitable materials, such as, for example, metal, plastic, vinyl, and/or other materials.

Figure 4:
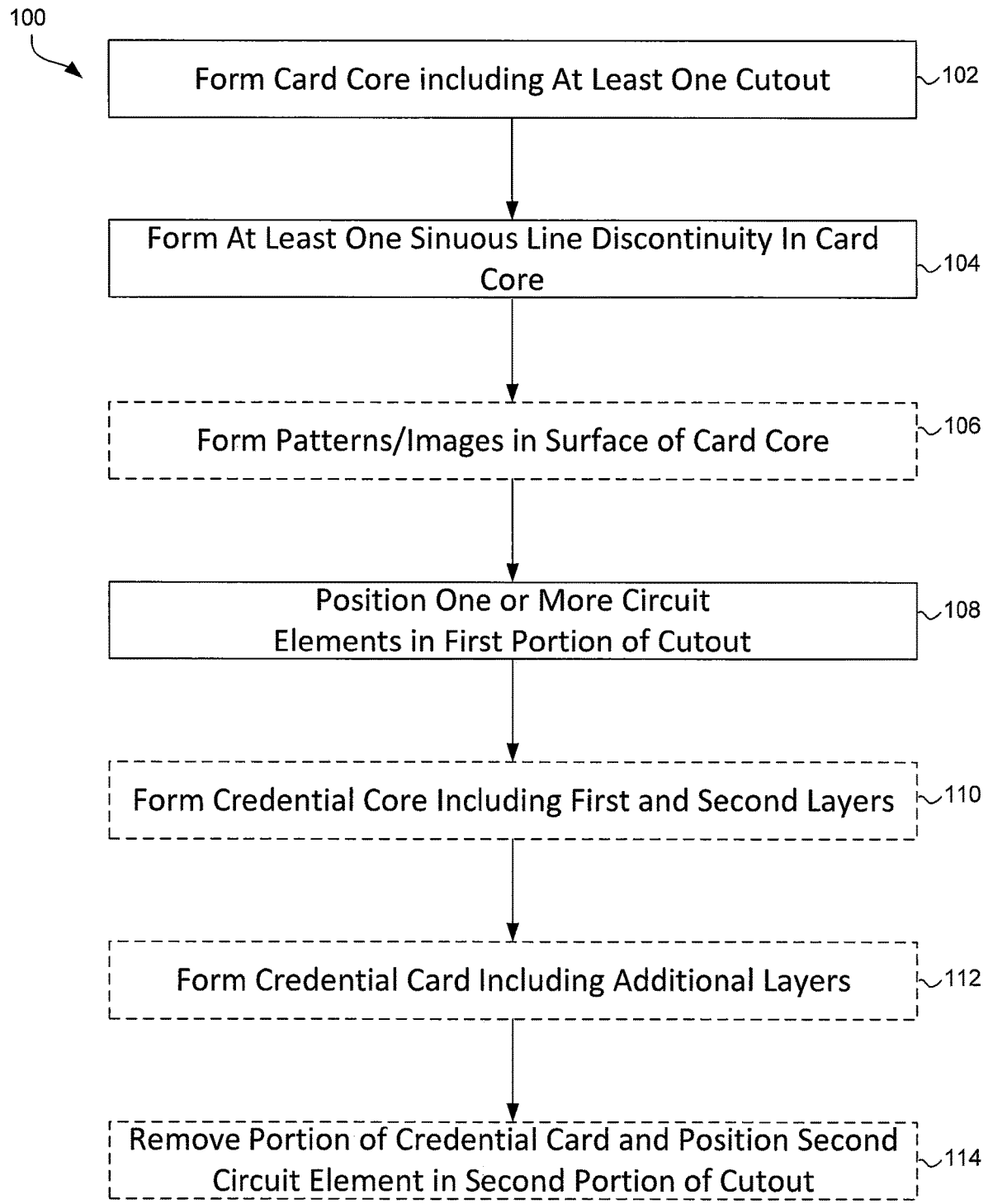
FIG. 4 is a flowchart illustrating a method of forming a credential card including a card core, in accordance with some embodiments

FIG. 4 is a flowchart illustrating a method 100 of forming a credential card including a card core 2, in accordance with some embodiments. At step 102, a card core 2 including a body 4 defining at least one cutout 8 is formed. The card core 2 can be formed using any suitable technique, such as, for example, pressing, stamping, milling, molding, etc. In some embodiment, the body 4 is formed defining the cutout 8. In other embodiments, a solid body is formed and the cutout 8 is subsequently formed in the solid body using any suitable technique, such as, for example, milling, drilling, etching, cutting, etc.

At step 104, a sinuous line discontinuity 10 is formed in the body 4 extending from a first edge 12a of the body 4 to the cutout 8. The sinuous line discontinuity 10 can be formed using any suitable technique, such as, for example, etching, stamping, laser cutting, mechanical cutting (milling or other mechanical/contact cutting), water-jet cutting, etc. The sinuous line discontinuity 10 includes one or more curves 34a, 34b and one or more straight line segments 36a-36c. In some embodiments, the straight line segments 36a-36c are parallel and define a plurality of fingers 22a, 22b configured to provide a flex profile substantially similar to the flex profile of the body 4.

At optional step 106, a surface 5 of the body 4 may be treated to form one or more patterns and/or images on the surface. For example, in some embodiments, the surface of the body 4 may be etched, milled, and/or otherwise processed to form a predetermined pattern, images, pictures, symbols, trademarks, words, pictograms, or other visual indicators. In some embodiments, at least a portion of the surface 5 may be colorized using any suitable colorization process, such as, for example, inking, printing, sintering, etc. The colorization may be in combination with and/or alternative to the formation of one or more patterns or images through surface treatment. Although steps 102-106 are illustrated as separate steps, it will be appreciated that steps 102-106 may be integrated into and/or performed simultaneously one or more of steps 102-106, and each combination is within the scope of this disclosure.

At step 108, one or more circuit elements are positioned within the cutout 8 defined in the card core 2. For example, in some embodiments, a first circuit element 16a, a plurality of contact pads 24a, 24b, and a plurality of leads 28a, 28b are formed on a circuit core using any suitable method. For example, the first circuit element 16a, a plurality of contact pads 24a, 24b, and a plurality of leads 28a, 28b may include printed circuit elements formed on the circuit core. The circuit core is positioned within the cutout 8 such that a first gap 26 is defined between the first circuit element 16a and the edge 9 of the cutout 8 to effectively electromagnetically isolate the first circuit element 16a from the material of the body 4. The circuit core and/or the individual circuit elements may be positioned using any suitable method, such as, for example, by hand, by a pick-and-place method, and/or using any other suitable method. In some embodiments, a second circuit element 16b may be positioned within the cutout 8, for example, within a second portion 8b of the cutout 8 simultaneous with the placement of the first circuit element 16a and/or the contact pads 24a, 24b.

At step 110, a credential core 200 including the card core 2 is formed. The credential core may be formed by coupling a thermoplastic layer 80 on a first side of the card core 2, as illustrated in FIG. 5. The thermoplastic layer 80 may be simultaneously coupled to the card core 2 and/or the circuit elements 16a positioned therein so as to form a credential core 200. In some embodiments, the thermoplastic layer 80 is coupled to the card core 2 at a predetermined pressure and/or at a predetermined temperature. The thermoplastic layer 80 may include any suitable material, such as, for example, a moly-based material (e.g., molybendum), polyvinyl chloride (PVC), a copolymer of vinyl chloride, polyolefin, polycarbonate, polyester, polyamide, acrylonitrile butadiene styrene copolymer (ABS), and the like. Examples of PVC films suitable for use with the invention are available from suppliers such as Klockner Pentaplast of America, Inc. of Gordonsville, VA; and Shijiazhuang Eurochem Co. Ltd of China. Examples of such a vinyl chloride copolymer resin are available from Dow Chemical Company under trade name of UCAR®, and from BASF of Ludwigshafen, Germany under trade name of Laroflex®. In some embodiments, a material layer 82 may be positioned between the thermoplastic layer 80 and the card core 2. The material layer 82 may include any suitable material, such as, for example, a cross-linkable polymer, an adhesive, and/or any other suitable material. Examples of cross-linkable polymers are disclosed in U.S. Pat. No. 9,275,321, granted on Mar. 1, 2016, and entitled "Information Carrying Card Comprising a Cross-Linked Polymer Composition, and Method of Making the Same," the disclosure of which is incorporated herein by reference in its entirety.

At optional step 112, a credential card may be formed by positioning one or more additional layers above and/or below the credential core formed at step 210. The additional layers may include any suitable materials or layers, such as, for example, image layers, sealing layers, thermoplastic layers, metal layers, conductive layers, non-conductive layers, and/or any other suitable layers. Although embodiments are discussed herein with respect to a single card core 2, a single credential core, and a single credential card, it will be appreciated that multiple card cores 2, credential cores, and/or credential cards may be formed simultaneously using any suitable process. Various processes for forming a credential card compatible with the metal card cores disclosed herein are disclosed in, for example, U.S. Pat. Appl. Pub. No. 2016/0152815, published Jun. 2, 2016, and is incorporated by reference herein in its entirety. A credential card including a card core, such as a card core 2, disclosed herein can be formed using any suitable method. For example, in various embodiments, a credential card including a card core 2 may be formed using a cold laminate process, injection molding, milling, laser cutting, water-jet processes, etc.

At optional step 114, a portion of each layer positioned above the contact pads 24a, 24b may be removed to expose the contact pads and a second circuit element 16b may be coupled to the contact pads 24a, 24b. The contact pads 24a, 24b may be exposed using any suitable process, such as, for example, etching, drilling, milling, etc. A portion of the credential card or card core may be removed around the contact pads 24a, 24b sufficient to allow a second circuit element 16b, such as a direct contact SoC element 32, to be positioned with a surface parallel to a plane defined by a surface of the credential card and/or the card core (as illustrated in FIG. 3).

Figure 7:
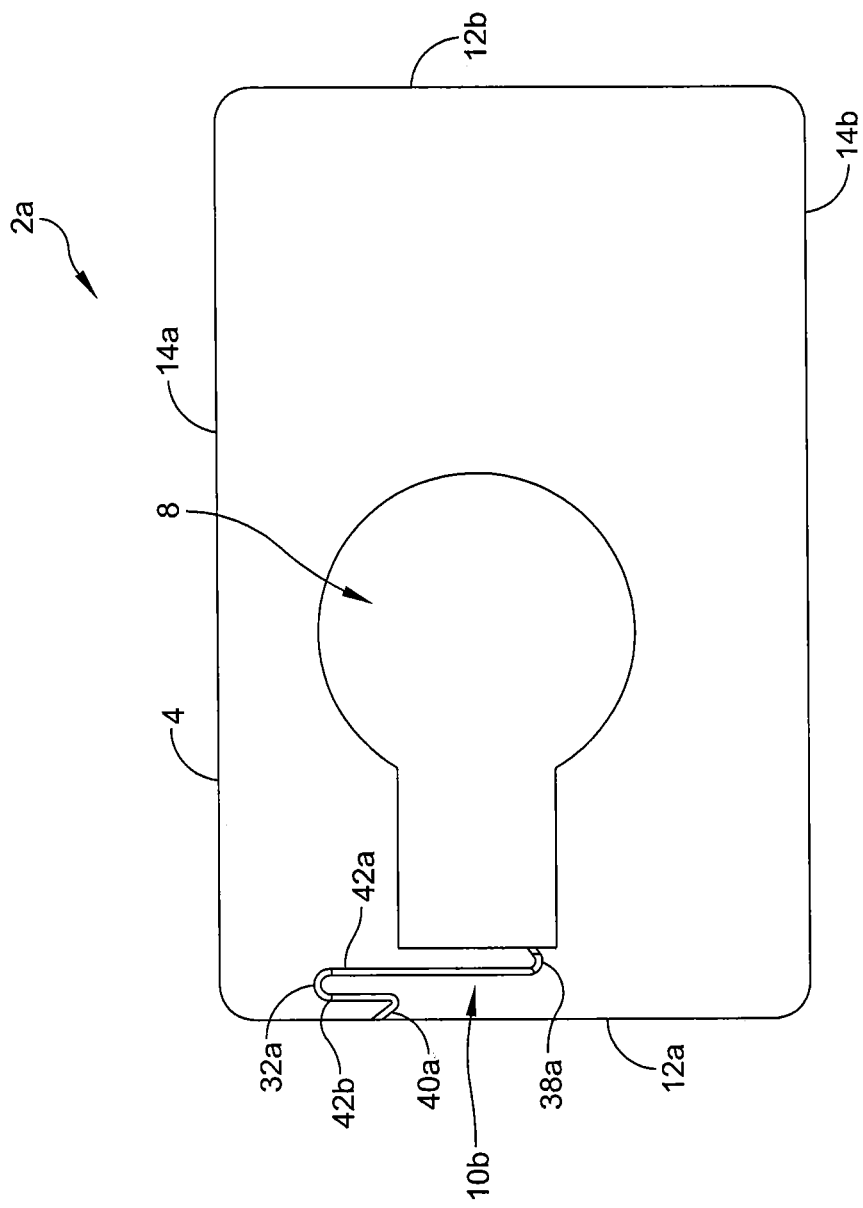
FIG. 7 illustrates a card core having an sinuous line discontinuity including an extended straight line portion and a truncated straight line portion, in accordance with some embodiments.

FIG. 6 illustrates a card core 2a having a sinuous line discontinuity 10a including a first straight line segment 36a and a second straight line segment 36b defining a single flexible finger 22, in accordance with some embodiments. The card core 2a is similar to the card core 2 discussed above, and similar description is not repeated herein. The sinuous line discontinuity 10a generally defines a curved path (e.g., a notch or channel) extending from an inner edge of the cutout 8 to an outer edge 12a of the core card 2a FIG. 7 illustrates a card core 2b having an sinuous line discontinuity 10b including an extended straight line portion 42a and a truncated straight line portion 42b, in accordance with some embodiments. The card core 2b is similar to the metal card core 2 discussed above in conjunction with FIG. 5, and similar description is not repeated herein. The card core 2b includes a sinuous line discontinuity 10b coupled to a lower portion of the second portion 8b of the cutout 8. A first substantially straight portion 42a of the discontinuity 10b has a longer length as compared to a first substantially straight portion 36a of the sinuous line discontinuity 10a of the card core 2 and a second straight portion 42b has a substantially shorter length. The sinuous line discontinuity 10b further includes a first portion 38a extending from the cutout 8 and a second portion 38b extending from the first edge 12a, each disposed at a non-parallel and non-perpendicular angle with respect to each of the edges 12a, 12b, 14a, 14b of the card core 2b.

Figure 8:
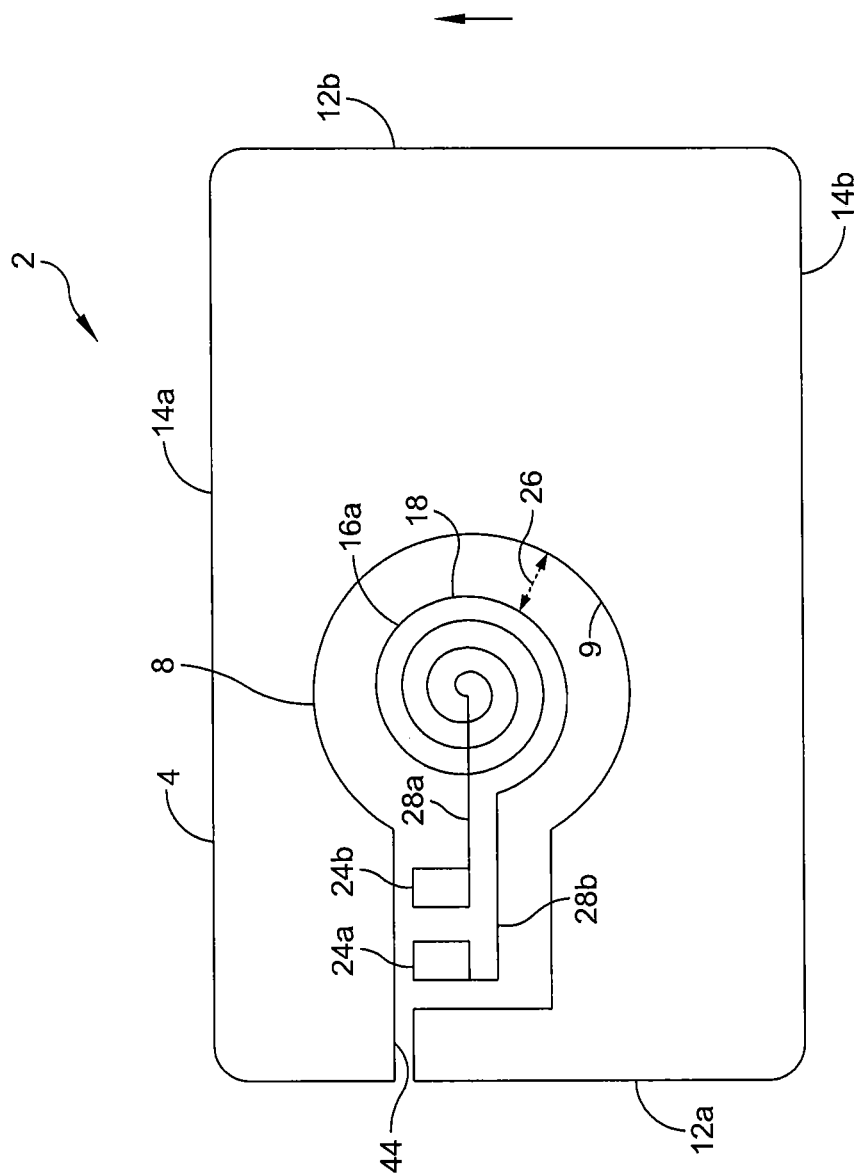
FIG. 8 illustrates a card core having a straight line discontinuity, in accordance with some embodiments.

FIG. 8 illustrates a card core 2c including a straight line discontinuity 44, in accordance with some embodiments. The card core 2c is similar to the card cores 2-2b described above, and similar description is not repeated herein. The card core 2c replaces the sinuous line discontinuity 10 with a straight line discontinuity 44 extending from an edge 9 of the cutout 8 to an edge 12a of the card core 2c. The straight line discontinuity 44 includes a thickness selected to effectively isolate a first side 20a of the discontinuity 44 from a second side 20b without substantially weakening the structure of the card core 2. For example, in various embodiments, the straight line discontinuity 44 includes a width (e.g., distance from first side 20a to second side 20b) of at least 300 microns, at least 500 microns, at least 700 microns, 300-900 microns, and/or any other suitable width.

Figure 9:
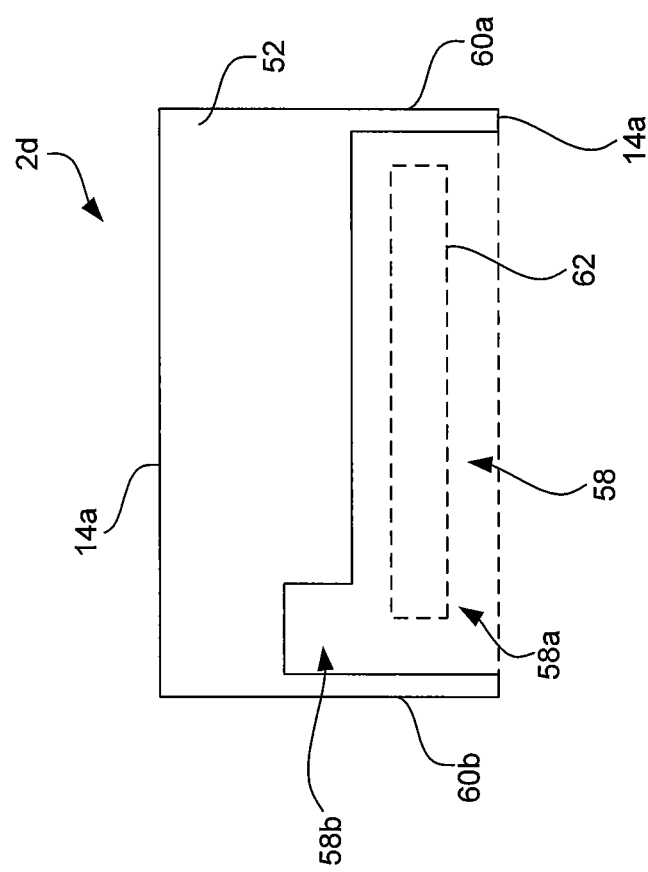
FIG. 9 illustrates an card core defining a cutout including a portion extending from a first edge of the card core, in accordance with some embodiments.

FIG. 9 illustrates a card core 2d including a cutout 58 extending to an edge 14a of the card core 2d, in accordance with some embodiments. The card core 2d is substantially similar to the card core 2 described above, and similar description is not repeated herein. The card core 2d includes a body 52 defining a cutout 58 including a first portion 58a and a second portion 58b. The body 52 extends substantially defined by a first short edge 12a, a second short edge 12b, a first long edge 14a, and a second long edge 14b. The cutout 58 extends from the first long edge 14a into the body 52 such that the cutout 58 defines a portion of the first long edge 14a of the card. As discussed above with respect to card core 2, one or more circuit elements may be positioned within any portion of the cutout 58 such that a gap (see FIGS. 2-3) sufficient to electrically isolate the circuit element from the card core 2d is maintained.

In the illustrated embodiment, the cutout 58 includes a first portion 58a having a first rectangular geometry extending between a first edge portion 60a of the card core 2d and a second edge portion 60b and a second portion 58b having a second rectangular geometry continuous with the first portion 58a. Although specific embodiments are illustrated, it will be appreciated that the cutout 58 can include any number of portions defining any number of geometries, and such embodiments are within the scope of this disclosure.

Figure 10:
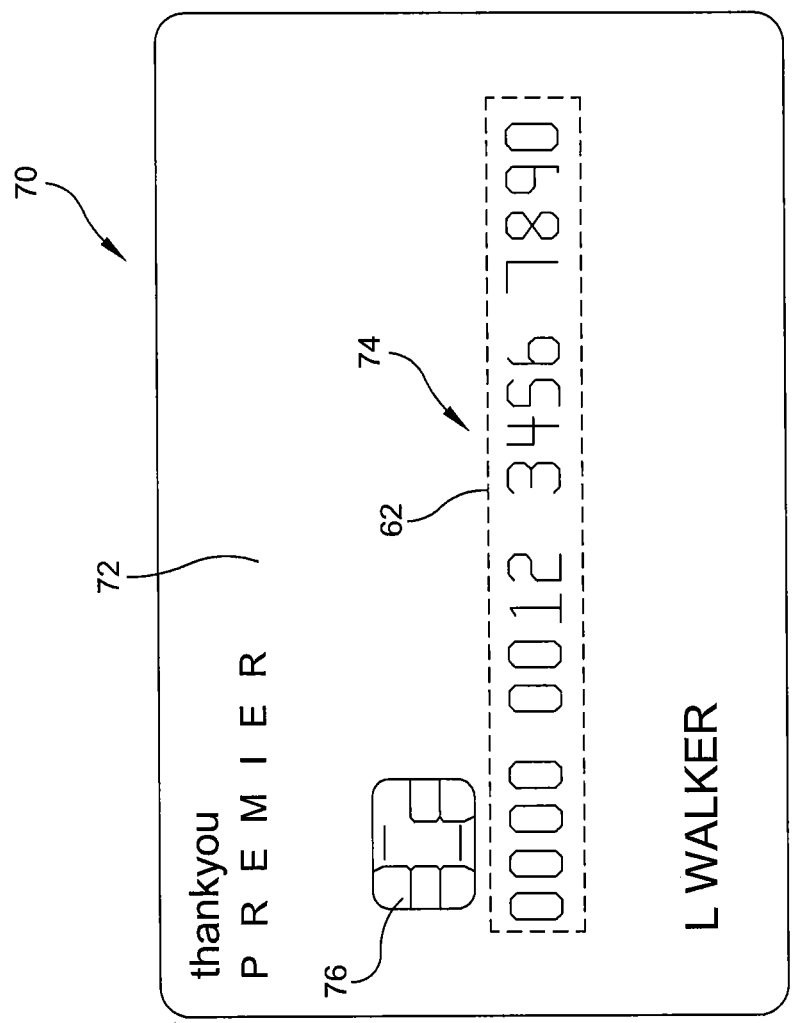
FIG. 10 illustrates a finished credential card incorporating the card core of FIG. 9, in accordance with some embodiments.

In some embodiments, a portion of the cutout 58, such as the first portion 58a, defines an embossable area 62. The embossable area 62 includes a portion of a card core 2d and/or a finished credential card including the card core 2d that may be subjected to known embossing techniques. For example, FIG. 10 illustrates a finished credential card 70 (i.e., a credit card) including an overlay layer 72 and an embossing 74 disposed within the embossable area 62. FIG. 10 further illustrates a circuit element 76, such as a direct contact SoC element, disposed within the second portion 58b of the cutout 58. The finished credential card 70 may be formed using any known technique, such as, for example, the method 100 discussed above in conjunction with FIG. 4.

Although the subject matter has been described in terms of exemplary embodiments, it is not limited thereto. Rather, the appended claims should be construed broadly, to include other variants and embodiments, which may be made by those skilled in the art.

What is claimed is:

1. A core for a credential card comprising:
   a metal body defining (i) at least one through-opening defined by an inner edge with a gap between an element positioned in the at least one through-opening and the inner edge so as to electromagnetically isolate the element from the body and (ii) at least one sinuous discontinuity, wherein the at least one sinuous discontinuity comprises a channel defined by the metal body that includes at least one of a curved portion and straight portion, wherein the sinuous discontinuity communicates between an outer edge surface of the body and the inner edge.

2. The core for a credential card of claim 1, wherein the sinuous discontinuity defines at least one flexible finger configured to provide a flex profile no less than a flex profile of the body when a force is applied to the core.

3. The core for a credential card of claim 1, wherein the at least one curved portion defines a 180° curve.

4. The core for a credential card of claim 1, wherein the sinuous discontinuity oscillates through the body.

5. The core for a credential card of claim 1, wherein the at least one through-opening includes a first portion having a first geometry and a second portion having a second geometry.

6. The core for a credential card of claim 5, wherein the first geometry and the second geometry are partially overlapping.

7. The core for a credential card of claim 5, wherein the first portion of the at least one through-opening is sized and configured to receive a first circuit element and the second portion of the at least one through-opening is sized and configured to receive a second circuit element.

8. The core for a credential card of claim 7, wherein the first circuit element is an antenna and the second circuit element is a direct-contact System-on-Chip (SoC) element.

9. The core for a credential card of claim 1, comprising a plurality of contact pads positioned within the at least one through-opening.

10. The core for a credential card of claim 1, wherein the body comprises a conductive metal.

11. A credential card, comprising:
a card core, comprising:
a metal body defining (i) at least one through-opening defined by an inner edge and (ii) at least one discontinuity, wherein the at least one discontinuity comprises a channel defined by the metal body that includes at least one of a curved portion and straight portion, wherein the discontinuity communicates between an outer edge surface of the body and the inner edge;
a first material layer disposed over a first side of the card core; and
a second material layer disposed over a second side of the card core, wherein the first material layer is coupled to the second material layer in a position substantially aligned with the at least one through-opening defined by the inner edge.

12. The credential card of claim 11, wherein the discontinuity comprises a sinuous channel including at least one of a curved portion and a straight line portion.

13. The credential card of claim 12, wherein the at least one curved portion and the at least one straight line portion together define at least one flexible finger configured to provide a flex profile no less than a flex profile for the body when a force is applied to the credential card.

14. The credential card of claim 12, wherein the sinuous channel is configured to distribute torque pressure evenly across a surface area of the credential card so as to avoid cracking or breaking of the first material layer or the second material layer when a force is applied to the credential card.

15. The credential card of claim 11, wherein the at least one through-opening further defines a first portion having a first geometry and a second portion having a second geometry.

16. The credential card of claim 11, comprising a plurality of contact pads positioned within the at least one through-opening.

17. The credential card of claim 11, further comprising at least one an antenna and a system-on-chip device.

18. A card core, comprising:
a body defining at least one through-opening that communicates with at least one channel, wherein the at least one through-opening wherein the channel defined by the body extending from an outer surface of the body to the at least one through-opening, wherein the at least one through-opening includes a first portion having a first geometry and a second portion having a second geometry, wherein the at least one through-opening is sized and configured to define a gap between an element positioned in the at least one through-opening and the edge to electromagnetically isolate the element from the body.

19. The card core of claim 18, wherein the channel forms a sinuous discontinuity.

* * * * *